US009281948B2

(12) United States Patent
Hallin et al.

(10) Patent No.: US 9,281,948 B2
(45) Date of Patent: Mar. 8, 2016

(54) REVOCATION INFORMATION FOR REVOCABLE ITEMS

(75) Inventors: Philip J. Hallin, Redmond, WA (US); Yogesh A. Mehta, Bellevue, WA (US); Violet Anna Barhudarian, Kirkland, WA (US); Magnus Bo Gustaf Nyström, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 13/370,185

(22) Filed: Feb. 9, 2012

(65) Prior Publication Data

US 2013/0212383 A1    Aug. 15, 2013

(51) Int. Cl.
*H04L 29/06* (2006.01)
*H04L 9/32* (2006.01)
*G06F 21/62* (2013.01)

(52) U.S. Cl.
CPC .......... *H04L 9/3268* (2013.01); *H04L 63/0823* (2013.01); *G06F 21/6209* (2013.01); *H04L 63/20* (2013.01)

(58) Field of Classification Search
CPC ... H04L 9/3268; H04L 9/3263; H04L 9/0891; H04L 63/0823
USPC ................................................. 713/158, 155
See application file for complete search history.

(56) References Cited

U.S. PATENT DOCUMENTS

| | | | | |
|---|---|---|---|---|
| 5,666,416 | A * | 9/1997 | Micali ................... | H04L 9/3268 380/286 |
| 6,230,266 | B1 * | 5/2001 | Perlman ................ | H04L 9/3268 713/156 |
| 6,816,900 | B1 | 11/2004 | Vogel et al. | |
| 7,028,181 | B1 | 4/2006 | McCullough et al. | |
| 7,240,194 | B2 | 7/2007 | Hallin et al. | |
| 7,650,497 | B2 | 1/2010 | Thornton et al. | |
| 7,877,600 | B2 | 1/2011 | Qiu et al. | |
| 2002/0026582 | A1 * | 2/2002 | Futamura .............. | H04L 9/3268 713/170 |
| 2003/0014629 | A1 | 1/2003 | Zuccherato | |
| 2003/0046536 | A1 * | 3/2003 | Bruekers ................ | G06Q 10/10 713/158 |
| 2004/0168056 | A1 * | 8/2004 | Dillaway ................ | G06F 21/10 713/156 |
| 2004/0210597 | A1 * | 10/2004 | Wanish .................. | G06F 21/10 |
| 2005/0120205 | A1 * | 6/2005 | Umezawa ........... | H04L 63/0442 713/156 |
| 2005/0228998 | A1 * | 10/2005 | Chan ..................... | H04L 9/3268 713/175 |
| 2007/0039058 | A1 * | 2/2007 | Alkove ............... | H04L 63/0428 726/27 |
| 2007/0055887 | A1 * | 3/2007 | Cross ..................... | G06F 21/33 713/185 |

(Continued)

OTHER PUBLICATIONS

U.S. Appl. No. 13/370,185, Hallin et al., Dao Ho.*

(Continued)

*Primary Examiner* — Dao Ho
(74) *Attorney, Agent, or Firm* — Timothy Churna; Kate Drakos; Micky Minhas (57) ABSTRACT

Techniques for providing revocation information for revocable items are described. In implementations, a revocation service is employed to manage revocation information for various revocable items. For example, the revocation service can maintain a revoked list that includes revoked revocable items, such as revoked digital certificates, revoked files (e.g., files that are considered to the unsafe), unsafe network resources (e.g., a website that is determined to be unsafe), and so on. In implementations, the revocation service can communicate a revoked list to a client device to enable the client device to maintain an updated list of revocation information.

19 Claims, 6 Drawing Sheets

(56) References Cited

U.S. PATENT DOCUMENTS

| | | | |
|---|---|---|---|
| 2007/0113074 A1* | 5/2007 | Ben-Menahem | H04L 63/0823 713/158 |
| 2008/0109440 A1* | 5/2008 | Uchiyama | G06F 17/30017 |
| 2009/0158036 A1* | 6/2009 | Barde | G06F 21/10 713/164 |
| 2009/0208007 A1* | 8/2009 | Ohmori | G11B 20/00086 380/201 |
| 2009/0235071 A1* | 9/2009 | Bellur | H04L 9/3268 713/158 |
| 2010/0199129 A1* | 8/2010 | Kitani | G11B 20/00086 714/25 |
| 2010/0250948 A1 | 9/2010 | Little et al. | |
| 2010/0262959 A1* | 10/2010 | Bruno | G06F 21/6209 717/171 |
| 2011/0246764 A1 | 10/2011 | Gamez et al. | |
| 2013/0212383 A1* | 8/2013 | Hallin | H04L 9/3268 713/158 |

OTHER PUBLICATIONS

Batarfi, Omar "Certificate Validation in Untrusted Domains", In *Proceedings of OTM 2003*, Available at <http://www.cs.newcastle.ac.uk/publications/inproceedings/papers/788.pdf>,(Oct. 2003),pp. 1-14.

Jain, Gaurav "Certificate Revocation: A Survey", Available at <http://citeseerx.ist.psu.edu/viewdoc/download?doi=10.1.1.17.587&rep=rep1&type=pdf>,(2005),pp. 1-8.

* cited by examiner

| | Revoked List version 1.3.1 | | | 502 |
|---|---|---|---|---|
| | Item ID (504) | Item Type (506) | Root Cert ID (508) | Revoke Date (510) |
| 512 | b6535880e01… | Root certificate | | |
| 514 | 24e17bc08de… | Digital Certificate | b6535880e01… | 3/15/2011 |
| 516 | e371f6983432… | File | | |
| 518 | 6f295ba66313… | Executable | 3aa912de6a8… | |
| 520 | 64e5b13aeb2… | Security Key | | |
| 522 | e4161b99918… | Network Location | | |

REVOCATION INFORMATION FOR REVOCABLE ITEMS

BACKGROUND

Today's computer user has access to a wide variety of network resources, such as for online shopping, social networking, content sharing, and so on. Many such resources utilize some form of trust verification mechanism to prevent sensitive user information from being exposed to an unauthorized entity. One example of such a mechanism is a digital certificate, which can be used to determine whether a network resource that provides the digital certificate is a trusted resource.

Digital certificates are typically issued to network resources by a certificate authority (CA), which can first verify the identity and the trustworthiness of a network resource before issuing a digital certificate to the resource. Further, a computing device can maintain a list of CAs which the device trusts to issue digital certificates. If a computing device determines that a digital certificate received from a network resource was issued by a trusted CA, the computing device can determine that the network resource may also be trusted. Thus, the computing device can correspond with the network resource in a secure manner such that sensitive information may not be exposed to an unauthorized (e.g., untrusted) entity.

While digital certificates provide a convenient way to establish a trust relationship between a computing device and a network resource, some security risks are involved in the use of digital certificates. For example, an untrusted entity can obtain unauthorized access to a legitimate digital certificate such that the untrusted entity appears to be a trusted entity. Such impersonation of a trusted entity is often referred to as "spoofing."

Since it is possible in some instances for an untrusted entity to obtain such unauthorized access to a legitimate digital certificate, it is useful to have the ability to revoke a digital certificate. For example, if a CA determines that a digital certificate has been imitated by an untrusted entity, the CA can issue information to computing devices indicating that the digital certificate is no longer valid and should not be relied upon to establish a trust relationship with a network resource.

However, current techniques for communicating digital certificate revocation information can be untimely and can cause revocation of a digital certificate to be undetected by a computing device for an extended period of time. In such scenarios, the computing device may continue to recognize a revoked digital certificate as legitimate, which may cause sensitive information to be exposed to an untrusted entity that provides the revoked digital certificate. Further, current techniques may be unsuccessful in communicating revocation information about a digital certificate if a network failure occurs during an attempt to communicate the revocation information to a computing device. In such a scenario, a computing device may not recognize the failed attempt to communicate the revocation information, and may continue to recognize a revoked digital certificate as legitimate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for providing revocation information for revocable items are described. In implementations, a revocation service is employed to manage revocation information for various revocable items. For example, the revocation service can maintain a revoked list that includes revoked revocable items, such as revoked digital certificates, revoked files (e.g., files that are considered to be unsafe), unsafe network resources (e.g., a website that is determined to be unsafe), and so on. The list of revoked revocable items can also include revoked public keys. For example, a public key can be revoked if it is determined that a private key associated with the public key has been compromised by an untrusted entity and/or that the public key is associated with a digital certificate that has been spoofed by an untrusted entity.

In implementations, the revocation service can communicate a revoked list to a client device. For example, a client device can query the revocation service for a current version of a revoked list. In response to the query, the revocation service can communicate a most recent version of the revoked list to the client device. For instance, a revoked list can be updated with identifiers for digital certificates that have been revoked. The identifiers can be received by the revocation service from a certificate authority (CA) that revokes the digital certificates.

Thus, a client device can maintain a current list of revoked revocable items that can be periodically updated by querying the revocation service. Alternatively or additionally, updates to a revoked list can be pushed from the revocation service to the client device If the client device encounters a resource associated with a revoked revocable item, the client device can ascertain that the resource is untrusted, e.g., unsafe. For example, if the client device receives a revoked digital certificate from a website, the client device can ascertain that the website is untrusted.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for providing revocation information for revocable items are described. In implementations, a revocation service is employed to manage revocation information for various revocable items. For example, the revocation service can maintain a revoked list that includes revoked revocable items, such as revoked digital certificates, revoked files (e.g., files that are considered to be unsafe), unsafe network resources (e.g., a website that is determined to be unsafe), and so on. The list of revoked revocable items can also include revoked public keys. For example, a public key can be revoked if it is determined that the public key has been spoofed by an untrusted entity and/or that the public key is associated with a digital certificate that has been spoofed by an untrusted entity.

In implementations, the revocation service can communicate a revoked list to a client device. For example, a client device can query the revocation service for a current version of a revoked list. In response to the query, the revocation service can communicate a most recent version of the revoked list to the client device. For instance, a revoked list can be updated with identifiers for digital certificates that have been revoked. The identifiers can be received by the revocation service from a certificate authority (CA) that revokes the digital certificates.

Thus, a client device can maintain a current list of revoked revocable items that can be periodically updated by querying the revocation service. Alternatively or additionally, updates to a revoked list can be pushed from the revocation service to the client device. For example, an update to a revoked list can be pushed to a client device when the update occurs, e.g., when the revocation service determines that a revocable item is to be revoked. Thus, in implementations a client device can be notified of a revocation in "real time," and need not wait for a periodic update to receive revocation information.

If the client device encounters a resource associated with a revoked revocable item, the client device can ascertain that the resource is untrusted, e.g., unsafe. For example, if the client device receives a revoked digital certificate from a website, the client device can ascertain that the website is untrusted.

In the following discussion, an example environment is first described that is operable to employ techniques for providing revocation information for revocable items described herein. Example procedures involving techniques for providing revocation information for revocable items are then described which may be employed in the example environment as well as in other environments. Accordingly, the example environments are not limited to performing the example procedures. Likewise, the example procedures are not limited to implementation in the example environment. Next, a section entitled "Example Revoked List" discusses an example revoked list in accordance with one or more embodiments. Finally, an example system and device are described that are operable to employ techniques discussed herein in accordance with one or more embodiments.

Example Environment

Figure 1:
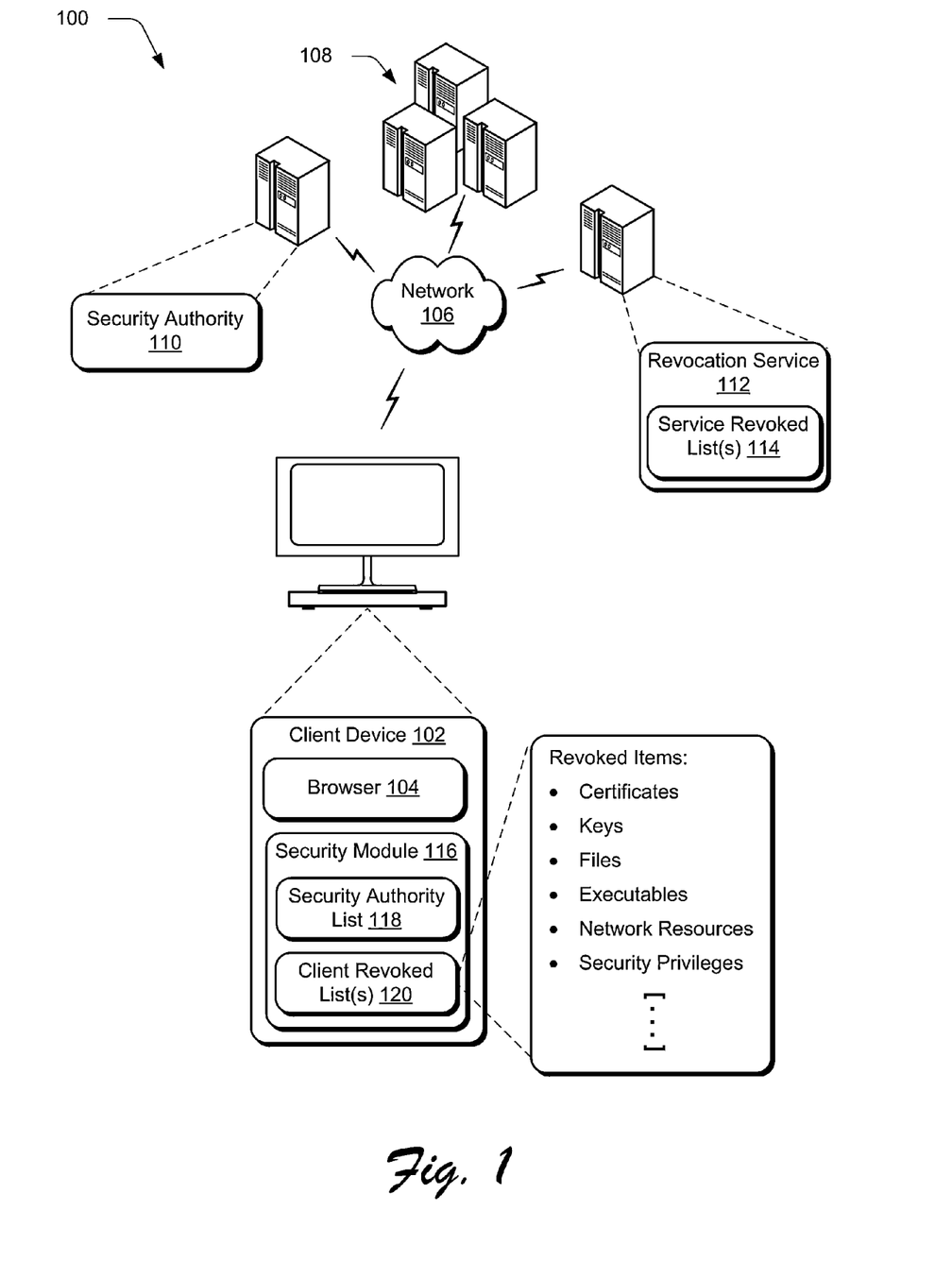
FIG. 1 is an illustration of an environment in an example implementation that is operable to employ techniques discussed herein.

FIG. 1 is an illustration of an environment 100 in an example implementation that is operable to employ techniques for providing revocation information for revocable items. Environment 100 includes a client device 102 which can be embodied as any suitable computing device such as, by way of example and not limitation, a desktop computer, a portable computer, a handheld computer such as a personal digital assistant (PDA), mobile phone, tablet computer, and the like. One of a variety of different examples of a client device 102 is shown and described below in FIG. 6.

The client device 102 of FIG. 1 is illustrated as including a browser 104, e.g., a web browser, which is representative of functionality that is configured to navigate via a network 106. The network 106 may include assume a wide variety of different configurations, such as the Internet, a wide area network (WAN), a local area network (LAN), a wireless network, a public telephone network, an intranet, and so on. Further, although a single network 106 is shown, the network 106 may be configured to include multiple networks.

The browser 104, for instance, may be configured to navigate via the network 106 to interact with content available from at least one network resource 108 as well as communicate data to the network resource 108, e.g., perform downloads and uploads. The network resource 108 may include any suitable computing resource that is configured to provide content that is accessible via the network 106. Examples of such content include web pages, text content, video content, audio content, and so on.

While embodiments are discussed herein with respect to a browser, techniques can be utilized to manage and communicate revocation information in a variety of different scenarios involving trust-related information. For example, implementations can be utilized to manage revocation information for applications, such as for validation information related to validating signed code included as part of an installation and/or updated to an application.

Illustrated as part of the environment 100 is a security authority 110, which is representative of functionality to generate and/or manage security information for various entities, such as the client device 102 and the network resource 108. For example, the security authority 110 can be configured as a certificate authority (CA) that can issue and/or manage digital certificates for various entities of the environment 100. Alternatively or additionally, the security authority 110 can be configured to manage other types of security information, such as for files, applications, content, websites, and so on.

To enable the network resource 108 to communicate with the client device 102 as a trusted resource, the network resource 108 can be verified as trusted with the security authority 110. As part of this verification, the network resource 108 can receive a digital certificate from the security authority 110 that identifies the network resource 108 as well as the security authority 110. The network resource 108 can use the digital certificate to communicate with the client device 102 as a trusted resource.

Further illustrated as part of the environment 100 is a revocation service 112, which is representative of functionality to manage and/or distribute revocation information. As illustrated, the revocation service 112 represents a separate entity from the security authority, and thus can be employed to manage and/or distribute revocation information for a variety of different security authorities. Included as part of the revocation service 112 is at least one service revoked list 114, which is representative of functionality to track different types of revocation information. For example, the revocation service 112 can receive a notification that a digital certificate has been compromised, e.g., spoofed. In implementations, the notification can be pushed from the security authority 110 to the revocation service 112, and/or can be received in response to a query submitted by the revocation service 112 to the security authority 110. In response to the notification, the revocation service 112 can store an indication that the digital certificate has been revoked as part of the service revoked list 114.

The service revoked list 114 can be propagated to other entities to provide the entities with revocation information, such as a list of revoked digital certificates. In implementations, when the service revoked list 114 is updated with new revocation information, a version indicator associated with the service revoked list can be updated to distinguish the updated list from previous versions of the service revoked list 114. For example, when the service revoked list 114 is updated, a version indicator can be monotonically increased to enable other devices and/or entities to distinguish from a previous version of the revoked list 114.

In implementations, the service revoked list 114 can be encrypted by the revocation service 112. For example, the service revoked list 114 can be encrypted using an encryption key such that only an entity with the correct decryption key can decrypt and access the service revoked list 114. The service revoked list 114 can be shared in an encrypted form among multiple devices, thus enabling another entity that receives and/or accesses the service revoked list 114 to verify that the service revoked list 114 originates from a trusted entity, e.g., the revocation service 112.

The client device 102 further includes a security module 116, which is representative of functionality to manage security information for the client device 102, such as digital certificates received from the network resource 108 and/or the security authority 110. As part of managing such security information, the security module 116 maintains a security authority list 118, which identifies different security authorities which are known to be trusted to the client device 102. For example, if the client device 102 receives a digital certificate which is issued by a CA identified in the security authority list 118, the client device 102 can ascertain that the digital certificate was issued by a trusted security authority.

The security authority list 118 can also identify security authorities that are configured to communicate revocation information to the revocation service 112. For example, the revocation service 112 can aggregate revocation information from different security authorities. The aggregated revocation information can be communicated from the revocation service 112 to the client device 102 without requiring the client device to communicate directly with the security authorities. In implementations, if a particular security authority is identified in the security authority list 118 as subscribing to the revocation service 112, the client device 102 can utilize the revocation service 112 to obtain revocation information for the particular security authority. Thus, the client device 102 may refrain from communicating directly with the particular security authority to obtain revocation information associated with the particular security authority.

The security module 116 includes and/or makes use of at least one client revoked list 120, which is representative of functionality to track revocation information for the client device 102. In implementations, the client revoked list 120 can be populated based on revocation information received from the revocation service 112. For example, the security module 116 can receive the service revoked list 114 from the revocation service 112, e.g., on a periodic basis. The security module 116 can use the service revoked list 114 to update the client revoked list 120. Thus, in at least some in implementations, the client revoked list 120 can be a duplicate of the service revoked list 114.

To prevent the client revoked list 120 from being tampered with by an unauthorized entity, the client revoked list 120 can be encrypted on the client device 102. For example, the client revoked list 120 can be encrypted using an encryption key, and only an entity with the correct decryption key can decrypt the client revoked list 120 such that changes can be made to the client revoked list.

In implementations, the client revoked list 120 can be shared (e.g., in an encrypted form) among multiple local entities, such as multiple users associated with the client device 102.

Illustrated as part of the client revoked list 120 are different types of revocable items which can be identified as revoked, such as digital certificates, security keys (e.g., public keys), files, executables (e.g., binaries, applications, scripts, and so on), network resources (e.g., websites, other devices, and so on), security privileges, and so forth. In implementations where a public key is revoked, digital certificates associated with the public key can be considered to be revoked. For example, if the client device 102 receives a digital certificate that is not indicated as revoked but that includes a revoked public key, the client device 102 can consider the digital certificate to be revoked.

In implementations, a digital certificate can be revoked for a specific purpose and remain valid for another. For example, a particular digital certificate can be revoked for purposes of validating a trusted status of application code. The same digital certificate, however, may remain valid for purposes of network communication, e.g., to validate a trusted status of network resource.

Various types of identifiers can be used to identify revocable items in the client revoked list 120, such as a hash of a digital signature for a digital certificate, a hash of a security key (e.g., a public key), a hash of code included as part of an executable, a hash of content included as part of a file, and so on. Thus, if a particular revocable item is identified in the client revoked list 120, the client device 102 can ascertain that the item is unsafe and can refrain from accessing the item and/or a resource associated with the item.

In implementations, revocation of a revocable item can be date-specific. For example, the security authority 110 can indicate that a revocable item associated with a particular date and/or dates is to be revoked. This can enable an instance of a revocable item with a particular date to be revoked, while enabling another instance of the revocable item with a different (e.g., earlier) date to remain valid.

For instance, consider a scenario where a CA issues multiple instances of a digital certificate during a particular period of time, e.g., January 2011 through February 2011. The CA then determines that the digital certificate was compromised on Mar. 15, 2011, such as by being spoofed by an untrusted entity. The CA can communicate an indication to the revocation service 112 that a digital certificate signed with a particular key prior to Mar. 15, 2011 can be considered valid, but that a digital certificate signed with the particular key on or after Mar. 15, 2011 are to be revoked. Thus, in implementations some instances of a revocable item can be revoked without all instances of the revocable item being revoked.

Having described an example environment in which the techniques described herein may operate, consider now a discussion of some example procedures in accordance with one or more embodiments.

Example Procedures

The following discussion describes example procedures for providing revocation information for revocable items in accordance with one or more embodiments. In portions of the following discussion, reference will be made to the environment 100 of FIG. 1.

Figure 2:
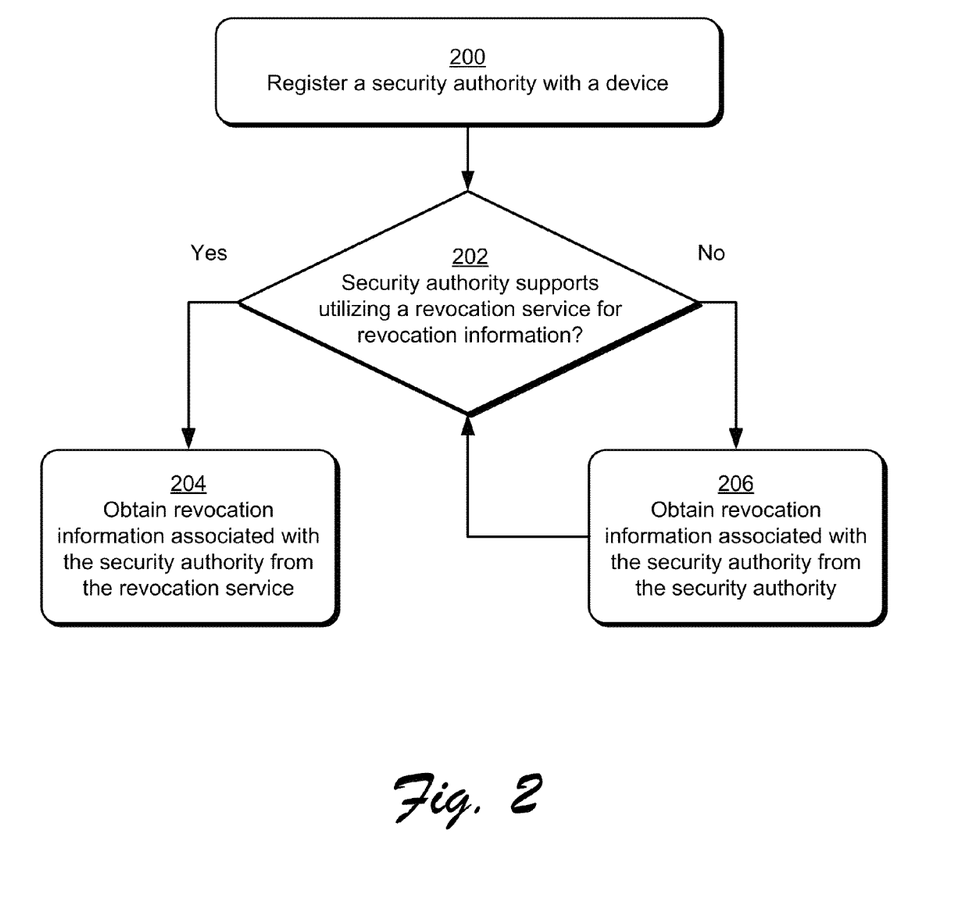
FIG. 2 is a flow diagram that describes steps in a method in accordance with one or more embodiments.

FIG. 2 is a flow diagram that describes steps in a method in accordance with one or more embodiments. Step 200 registers a security authority with a device. For example, a security authority (e.g., a CA) can participate in a validation process with a computing device that certifies the security authority as a trusted security authority. Step 202 ascertains whether the security authority supports utilizing a revocation service for revocation information. For example, a computing device can query the security authority to determine whether the security authority employs functionality for communicating revocation information to the revocation service.

Alternatively or additionally, a revocable item itself can include an indication of whether a security authority associated with the revocable item supports utilizing a revocation service. For example, a digital certificate can include information that indicates whether a CA associated with the digital certificate supports utilizing a revocation service for communicating revocation information associated with the digital certificate.

If the security authority supports utilizing the revocation service ("Yes"), step 204 obtains revocation information associated with the security authority from the revocation service. As mentioned above, the revocation information can include information about revoked digital certificates, security keys, files, executables, network resources, and so forth. Thus, in implementations the device can utilize the revocation service to obtain revocation information associated with the security authority, and can refrain from communicating directly with the security authority to obtain such information.

If the security authority does not support utilizing the revocation service ("No"), step 206 obtains revocation information associated with the security authority from the security authority. For example, the client device can communicate directly with the security authority to obtain revocation information for revocable items associated with the security authority.

In implementations, the method can return to step 202. For example, a security authority that is at one point ascertained to not support utilizing a revocation service can be reconfigured to support utilizing the revocation service, e.g., subsequent to initially being provisioned with the device. Thus, a device that receives a query response indicating that a security authority does not support utilizing a revocation service can subsequently re-query the security authority to determine if the security authority has been reconfigured to support utilizing the revocation service. For example, the client device can re-query the security authority on a periodic and/or on-demand basis.

Figure 3:
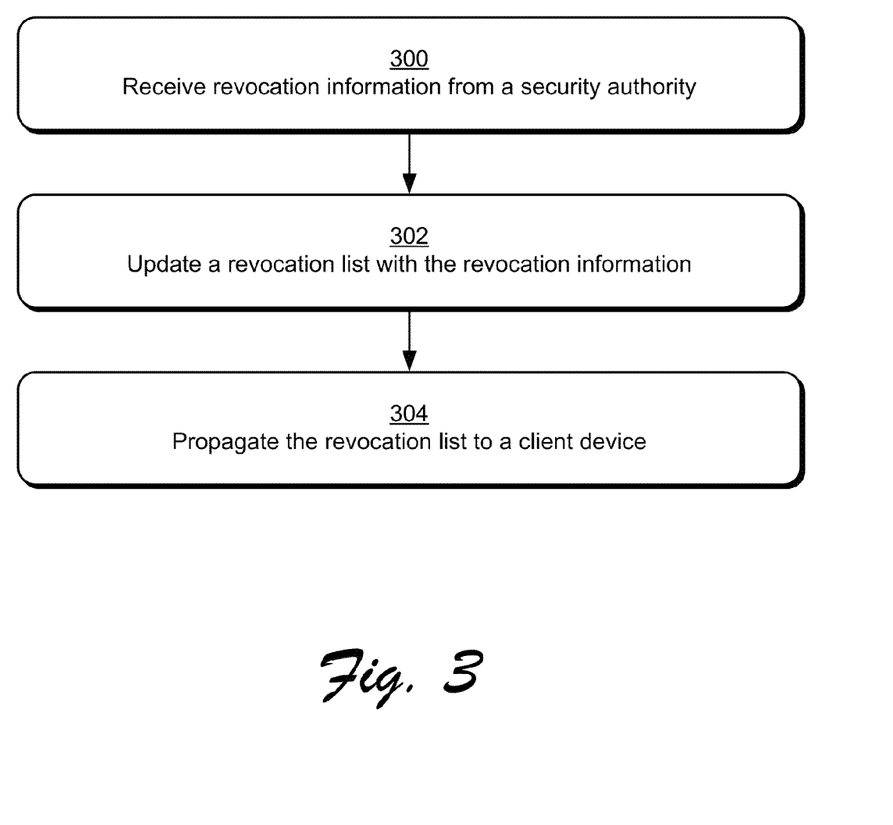
FIG. 3 is a flow diagram that describes steps in a method in accordance with one or more embodiments.

FIG. 3 is a flow diagram that describes steps in a method in accordance with one or more embodiments. Step 300 receives revocation information from a security authority. For example, the revocation service 112 can receive identifiers for revoked revocable items from different security authorities (e.g., CAs), such as the security authority 110.

Step 302 updates a revoked list with the revocation information. For example, the revocation service 112 can update the service revoked list 114 with the revocation information. In implementations, when a revoked list is updated with revocation information, a version indicator for the revoked list can also be updated. For example, a revoked list version 1.2.1 can be updated with new revocation information to a revoked list version 1.2.2. This can enable devices that receive a revoked list to ensure that a most recent version of the revoked list is being utilized.

Step 304 propagates the revoked list to a client device. For example, the revocation service 112 can communicate the service revoked list 114 to the client device 102. In implementations, a variety of different devices can receive revocation information from the revocation service 112. Thus, the revocation service 112 can aggregate revocation information from a wide variety of different security authorities, and can propagate the revocation information to a wide variety of different devices and/or entities.

Figure 4:
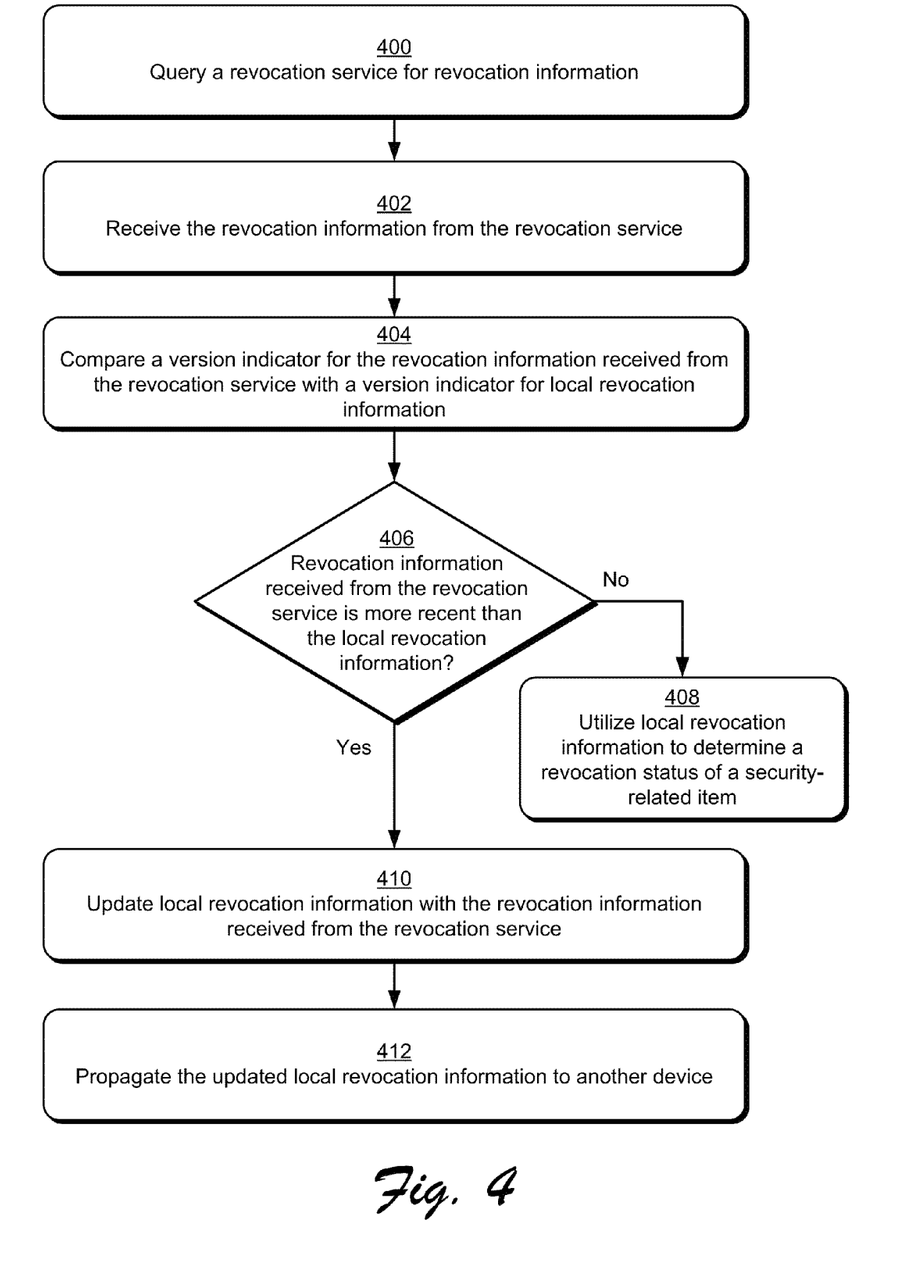
FIG. 4 is a flow diagram that describes steps in a method in accordance with one or more embodiments.

FIG. 4 is a flow diagram that describes steps in a method in accordance with one or more embodiments. Step 400 queries a revocation service for revocation information. For example, the client device 102 can query the revocation service 112 for the service revoked list 114. In implementations, the client device 102 can query the revocation service 112 for the service revoked list 114 on a periodic basis, e.g., every few hours, once a day, once a week, and so on. Alternatively or additionally, revocation information can be pushed from a revocation service to a client device, e.g., independent of a query from the client device for the revocation information. In another example implementation, the client device 102 can query the revocation service 112 for the service revoked list 114 in response to a notification from the revocation service that the service revoked list has been updated.

Step 402 receives the revocation information from the revocation service. For example, the client device 102 can receive the service revoked list 114 from the revocation service 112. In implementations, the client device 102 can verify a trusted status of the service revoked list 114. For example, the client device 102 can verify that the service revoked list 114 is signed with a correct digital signature. If the service revoked list 114 is not signed with the correct digital signature, the client device 102 can reject the service revoked list 114 and/or one or more updates to the service revoked list. If the service revoked list 114 is signed with the correct digital signature, the client device 102 can continue utilizing the service revoked list.

Step 404 compares a version indicator for the revocation information received from the revocation service with a version indicator for local revocation information. For example, the client device 102 can compare a version indicator included as part of the service revoked list 114 to a version indicator for the client revoked list 120.

Step 406 ascertains whether the revocation information received from the revocation service is more recent than the local revocation information. For example, the client device 102 can ascertain whether the version indicator for the service revoked list 114 indicates that the service revoked list is newer (e.g., includes more recent revocation information) than the client revoked list 120. If the revocation information received from the revocation service is not more recent than the local revocation information ("No"), step 408 utilizes the local revocation information to determine a revocation status of a revocable item. For example, if the client device 102 determines that the service revoked list 114 is not newer than the client revoked list 120, the client device 102 can utilize the client revoked list 120 determine revocation statuses of revocable items.

If the revocation information received from the revocation service is more recent than the local revocation information ("Yes"), step 410 updates the local revocation information with the revocation information received from the revocation service. For example, the client device 102 can update and/or replace the client revoked list 120 using the service revoked list 114.

Step 412 propagates the updated local revocation information to another entity. For example, consider a scenario where a device on which the local revocation information is updated is associated with multiple user accounts. When local revocation information associated with one user account for the device is updated, the updated revocation information can be automatically propagated to other user accounts for the device. In implementations, the updated revocation information can also be automatically propagated to various services and/or applications on a device that can utilize revocation information. In at least some implementations, step 412 can be optional.

As another example scenario, updated revocation information can also be propagated from a device associated with one user to another device associated with another user. For example, devices associated with different users can be related together as part of a group, such as part of an enterprise user account, a LAN, an ad hoc wireless network, and so on. Thus, when one device of the group receives updated revocation information, the device can propagate the updated revocation information to other devices of the group. This can enable the other devices of the group to obtain updated revocation information without contacting the revocation service.

Having discussed some example procedures, consider now a discussion of an example revoked list in accordance with one or more embodiments.

Example Revoked List

Figure 5:
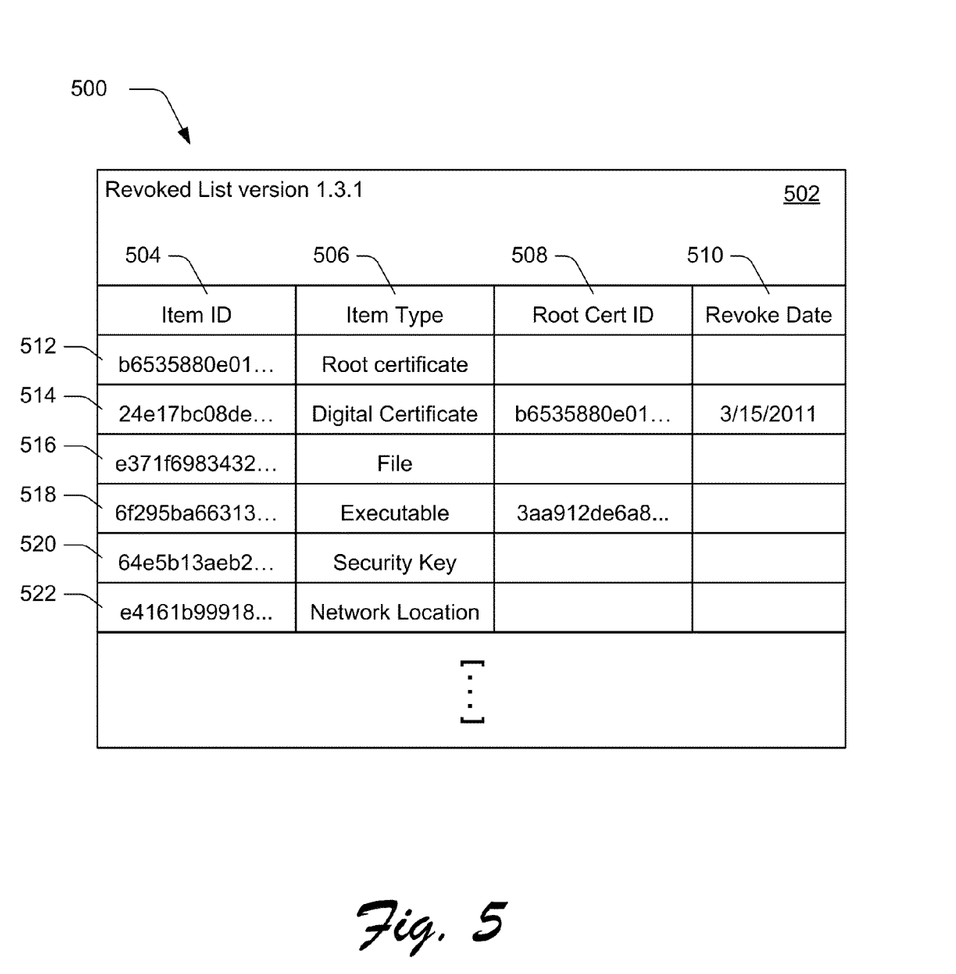
FIG. 5 illustrates an example revoked list in accordance with one or more embodiments.

FIG. 5 illustrates an example revoked list 500 in accordance with one or more embodiments. In implementations, the revoked list 500 can be configured as a service revoked list, a client revoked list, and so on.

The revoked list 500 includes a list header 502, which is utilized to specify information about the revoked list 500. For example, the list header 502 can include version information for the revoked list 500, as discussed in more detail above. The list header 502 can also include information about access permissions for the revoked list 500. For example, the list header 502 can reference an access control list (ACL) that identifies devices, users, and/or other entities that have permission to access and/or make changes to the revoked list 500.

The list header 502 can also include a digital signature for the revoked list 500 that can be used to verify the authenticity of the revoked list 500 and/or to verify that the revoked list 500 has not been tampered with by an unauthorized entity. For example, when the revoked list 500 is generated and/or updated, the revoked list can be signed with a digital signature. When a device accesses the revoked list 500, the digital signature can be verified before the revoked list 500 is designated by the device as valid, e.g., trusted. For instance, the digital signature can be determined to be trusted or untrusted using X.509 certificate chain validation to an operating system trusted root key. Thus, in implementations different valid keys can be used to sign the revoked list 500.

The revoked list 500 further includes a number of sections that specify information about revocable items listed in the revoked list. These sections include an item identifier (ID) section 504, an item type section 506, a root certificate ID section 508, and a revoked date section 510. The item ID section 504 includes identifiers for various revocable items listed in the revoked list 500. For example, the item ID section 504 can include a hash of a digital signature for a digital certificate, a hash of a public key, a hash of a filename, and so on. These are presented for purpose of example only, and a wide variety of different identifiers can be used to identify revocable items in accordance with the claimed embodiments.

The item type section 506 includes type identifiers for revocable items listed in the revoked list 500. The root certificate ID section 508 can be used to identify a root certificate associated with a particular revocable item. This aspect of the revoked list 500 is discussed in more detail below. The revoked date section 510 can be used to specify a date and/or dates on which a particular revocable item is revoked. This notion is discussed in more detail above.

Further included as part of the revoked list 500 are a number of revocable items that have been designated as revoked. For example, an item 512 lists a root certificate that has been revoked. In implementations, a root certificate can be issued by a trusted security authority (e.g., CA) and can be used to verify that various items (e.g., revocable items) originate from a trusted resource. For example, other digital certificates can be signed using a root certificate and can be determined to be trusted based on a trusted status of the root certificate. Thus, if a root certificate is indicated as revoked, digital signatures that are signed using the root certificate can be indicated as revoked.

The revoked list 500 also includes an item 514, which identifies a digital certificate that has been revoked. For example, the item 514 can be determined to be revoked based on its identifier listed in the item ID section 504. Alternatively or additionally, the item 514 can be determined to be revoked based on its being associated with a revoked root certificate identified in the root certificate ID section 508. The item 514 is further associated with a revoked date, as listed in the revoked date section 510. Further details concerning revoke dates associated with revocable items are discussed above.

An item 516 is included as part of the revoked list 500, and includes information about a file that has been revoked. For example, the file can be associated with various types of content, such as text content, video, audio, images, and so on. Thus, the item 516 can be used to indicate that a file has been determined to be unsafe. For example, the file may have originated from an untrusted resource, may have been tampered with by an untrusted resource, may include malicious executable code (e.g., malware), and so on. In implementations, if a device encounters a file that has been indicated as revoked, the device can refrain from opening the file. Alternatively or additionally, the device can cause the file to be deleted and/or can report the presence of the file to a security functionality associated with the device.

An item 518 includes information for an executable that has been designated as revoked. As mentioned above, an executable can identify various types of executable code, such as an application, a utility, a binary, script, and so on. An item 520 includes information about a security key that has been revoked. As referenced above, a public/private key pair can be determined to be untrusted, and thus digital certificates associated with the public/private key pair can be considered to be untrusted.

Finally, an item 522 includes information about a network location that has been revoked. Examples of a network location can include a website, a webpage, a server location, a particular device, and so on.

The revocable items and properties illustrated as part of the revoked list 500 are presented for purposes of example only, and a revoked list may include a wide variety of other revocable items and properties pertaining thereto according to the claimed embodiments.

Having discussed an example revoked list, consider now a discussion of an example system and device in accordance with one or more embodiments.

Example System and Device

Figure 6:
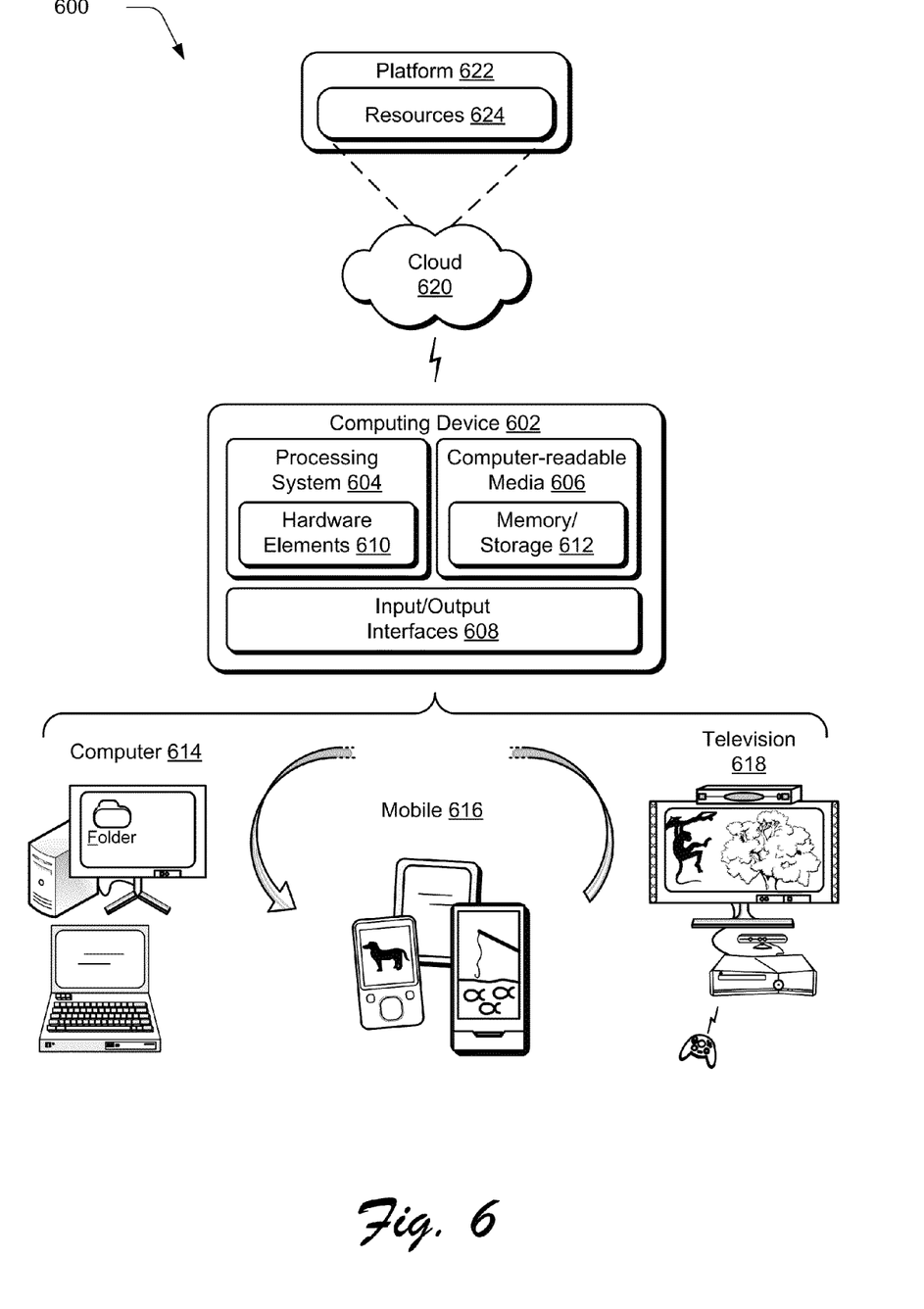
FIG. 6 illustrates an example system and computing device as described with reference to FIG. 1, which are configured to implement embodiments of techniques described herein.

FIG. 6 illustrates an example system generally at 600 that includes an example computing device 602 that is representative of one or more computing systems and/or devices that may implement various techniques described herein. For example, the client device 102 discussed above with reference to FIG. 1 can be embodied as the computing device 602. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media does not include signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as an module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. For example, functionalities discussed with reference to the client device 102 and/or the revocation service 112 may be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Conclusion

Techniques for providing revocation information for revocable items are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
    ascertaining, by at least one computing device, whether a security authority supports utilizing a separate revocation service for propagating revocation information for at least one revocable item associated with the security authority;
    obtaining, by the at least one computing device, based at least on to a determination that the security authority supports utilizing the separate revocation service, revocation information for the at least one revocable item from the revocation service, the revocation information including:
        an item identifier for each of the at least one revocable items;
        a root certificate identifier for each of the at least one revocable items based on the revocable item being associated with a root certificate; and
        a digital signature of the revocation service;
    determining, by the at least one computing device, whether the obtained revocation information is a more recent version than client revocation information stored at the at least one computing device by comparing a service version indicator included as part of the obtained revocation information with a client version indicator stored at the at least one computing device;
    based at least on determining that the obtained revocation information is a more recent version, updating, by the at least one computing device, at least a portion of the client revocation information with the revocation information obtained from the revocation service; and based at least on determining that the obtained revocation information is not a more recent version, utilizing, by the at least one computing device, the client revocation information to determine a revocation status of the at least one revocable item.

2. A method as described in claim 1, wherein the security authority comprises a certificate authority and the at least one revocable item comprises a digital certificate.

3. A method as described in claim 1, wherein the at least one revocable item comprises one or more of a security key, a file, an executable, a security privilege, or a network resource.

4. A method as described in claim 1, wherein the at least one revocable item comprises a public key, the revocation information indicates that the public key is revoked, and wherein the method further comprises causing at least one digital certificate associated with the public key to be revoked based at least on the public key being revoked.

5. A method as described in claim 1, wherein said obtaining by the at least one computing device comprises obtaining the revocation information as part of a revoked list that is maintained by the revocation service and that includes revocation information for different revocable items aggregated from different security authorities.

6. A method as described in claim 1, wherein said obtaining by the at least one computing device is further based on a client query to the revocation service for the revocation information, the client being configured to periodically query the revocation service for an updated version of revocation information.

7. A method as described in claim 1, wherein the revocation information is associated with a revoked date that specifies that versions of the at least one revocable item issued on or after the revoked date are to be revoked.

8. A method as described in claim 1, wherein said obtaining comprises obtaining the revocation information by an entity associated with a client device, and wherein the method further comprises propagating the revocation information from the entity to one or more other entities associated with the client device.

9. One or more computer-readable storage media comprising instructions stored thereon that, responsive to execution by a computing device, cause the computing device to perform operations comprising:
  ascertaining, by the computing device, whether a security authority supports utilizing a separate revocation service for propagating revocation information for at least one revocable item associated with the security authority, the at least one revocable item comprising a public key;
  utilizing, by the computing device, based at least on ascertaining that the security authority supports utilizing the separate revocation service, the revocation service to check for the revocation information;
  receiving, by the computing device, the revocation information for the at least one revocable item from the revocation service, the revocation information including a digital signature of the revocation service useable to verify authenticity of the revocation information and indicating that the public key has been revoked;
  ascertaining, by the computing device, that at least one digital certificate associated with the public key is revoked and that the revocation information includes a revoked date for the at least one revocable item;
  causing, by the computing device, one or more instances of the at least one revocable item to be revoked as of the revoked date, and
  updating client revocation information maintained by the computing device using the received revocation information.

10. One or more computer-readable storage media as recited in claim 9, further comprising:
  maintaining a list of security authorities that support utilizing the revocation service for propagating revocation information; and
  refraining from communicating with at least one of the security authorities to receive revocation information based at least on the at least one of the security authorities being included in the list.

11. One or more computer-readable storage media as recited in claim 9, wherein the at least one revocable item further comprises one or more of a security key, a file, an executable, or a network resource.

12. One or more computer-readable storage media as recited in claim 9, further comprising:
  receiving the revocation information for the at least one revocable item as part of a list of revocation information maintained by the revocation service; and
  updating client revocation information maintained by the computing device using the list of revocation information maintained by the revocation service.

13. One or more computer-readable storage media as recited in claim 9, further comprising:
  comparing a service version indicator included as part of the revocation information obtained from the revocation service with a client version indicator included as part of client revocation information to ascertain whether the revocation information obtained from the revocation service is a more recent version than client revocation information stored at the computing device;
  based at least on determining that the revocation information obtained from the revocation service is a more recent version than the client revocation information stored at the computing device, updating at least a portion of the client revocation information with the revocation information obtained from the revocation service; and
  based at least on determining that the revocation information obtained from the revocation service is not a more recent version than client revocation information stored at the computing device, utilizing the client revocation information to determine a revocation status of the at least one revocable item.

14. A system, comprising:
  at least one processor; and
  a memory coupled to the at least one processor storing program instructions executable by the at least one processor to perform operations including:
    ascertaining whether a security authority supports utilizing a separate revocation service for propagating revocation information for at least one revocable item associated with the security authority;
    obtaining, based at least on a determination that the security authority supports utilizing the separate revocation service, revocation information for the at least one revocable item from the revocation service, the revocation information including:
      an item identifier for each of the at least one revocable items;
      a root certificate identifier for each of the at least one revocable items based on the revocable item being associated with a root certificate; and
      a digital signature of the revocation service;

obtaining, from the revocation service and independent of a request, updated revocation information for the at least one revocable item; and updating, with the updated revocation information, a client revocation list stored locally at the system and comprising revocation information for a plurality of revocable items including the at least one revocable item such that revocation information for the at least one revocable item in the client revocation list is updated based on the updated revocation information.

15. The system of claim 14, wherein the security authority comprises a certificate authority and the at least one revocable item comprises a digital certificate.

16. The system of claim 14, wherein the at least one revocable item comprises one or more of a security key, a file, an executable, a security privilege, or a network resource.

17. The system of claim 14, wherein said obtaining the revocation information comprises obtaining the revocation information as part of a revoked list that is maintained by the revocation service and that includes revocation information for different revocable items aggregated from different security authorities.

18. The system of claim 14, wherein the program instructions are further executable by the at least one processor to perform operations including:

comparing a service version indicator included as part of the revocation information obtained from the revocation service with a client version indicator included as part of client revocation information;

based at least on determining that the service version indicator indicates that the revocation information obtained from the revocation service is more recent than the client revocation information, updating at least a portion of the client revocation information with the revocation information obtained from the revocation service; and based at least on determining that the service version indicator indicates that the revocation information obtained from the revocation service is not more recent than the client revocation information, utilizing the client revocation information to determine a revocation status of the at least one revocable item.

19. The system of claim 14, wherein the program instructions are further executable by the at least one processor to perform operations comprising:

ascertaining that the revocation information in the client revocation list includes a revoked date for the at least one revocable item; and causing one or more instances of the at least one revocable item including a revoked date to be revoked as of the revoked date.

\* \* \* \* \*